INVENTOR
A.L.W. WILLIAMS
BY [signature]
ATTORNEY

June 7, 1955 A. L. W. WILLIAMS 2,710,191

MAGNETIC RECORD TRANSDUCING SYSTEM

Original Filed June 7, 1947 4 Sheets-Sheet 2

INVENTOR
A. L. W. WILLIAMS
BY [signature]
ATTORNEY

INVENTOR
A.L.W. WILLIAMS
BY [signature]
ATTORNEY

INVENTOR
A.L.W. WILLIAMS
BY Pineles & Greene
ATTORNEY

United States Patent Office 2,710,191

Patented June 7, 1955

2,710,191

MAGNETIC RECORD TRANSDUCING SYSTEM

Alfred Leslie W. Williams, Cleveland Heights, Ohio, assignor, by mesne assignments, to Clevite Corporation, Cleveland, Ohio, a corporation of Ohio Original application June 7, 1947, Serial No. 753,159. Divided and this application May 19, 1949, Serial No. 94,068

3 Claims. (Cl. 274—4)

This invention relates to magnetic recording and reproducing systems, in which magnetic signals are recorded and reproduced by magnetic flux interlinkage between windings of a magnetic record transducer head and relatively movable elements of a magnetic recording medium engaging the pole faces of the transducer head. This application is a division of application for United States Letters Patent Serial No. 753,159, filed June 7, 1947, now Patent No. 2,567,092, which application is a continuation-in-part of application Serial No. 651,637, filed March 2, 1946, now abandoned.

The present invention is directed to magnetic recording systems of the type using a magnetic recording medium having an extended magnetic record surface on which signals are magnetically recorded along a succession of interconnected, continuous adjacent record traces which are tangibly indistinguishable along the record surface and in which the recording medium may be formed, for instance, by a flexible sleeve or belt-shaped sheet member having an exposed endless record surface on which signals are recorded along adjacent helical spiral record traces.

Among the objects of the invention is a recording system in which a guide structure, having continuous guide tracks such as spiral or helical grooves extending in the form of a succession of interconnected, adjacent, tangible guide track convolutions such as a lead screw, is combined with a magnetic record structure of the foregoing type and a magnetic record transducer head having a half-nut or the like engaging the guide tracks so that as the guide structure and the record structure move in unison the pole faces of the record transducer head move along a continuous magnetic record trace on the record surface, the location of the magnetic record traces being fixed and determined by the location of the guide tracks on the guide structure.

A distinct object of the invention is a magnetic recording system of the foregoing type, combining an extended magnetic record surface with a guide track surface having tangible guide tracks which fix the location of the magnetic record traces along which magnetic signals may be recorded or played back, although the magnetic record traces are tangibly indistinguishable.

Another distinct object of the invention is a magnetic recording system of the foregoing type provided with at least two predetermined fixed aligning elements which determine the location of the record traces along which magnetic signals may be predeterminedly recorded on the record surface, or played back therefrom by reference to said aligning elements.

The foregoing and other objects of the invention will be best understood from the following description of exemplifications thereof, reference being had to the accompanying drawings wherein.

Figure 3:
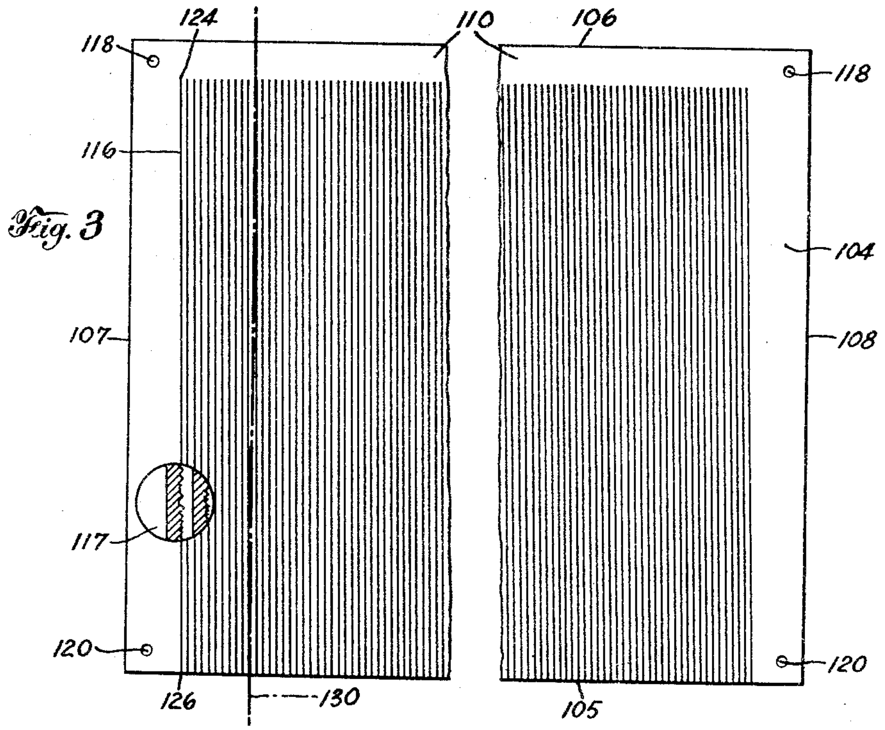
Fig. 3 is a plan view of a novel record member of the invention for use in the system shown in Figs. 1 and 2.
Figures 3A, 3B:
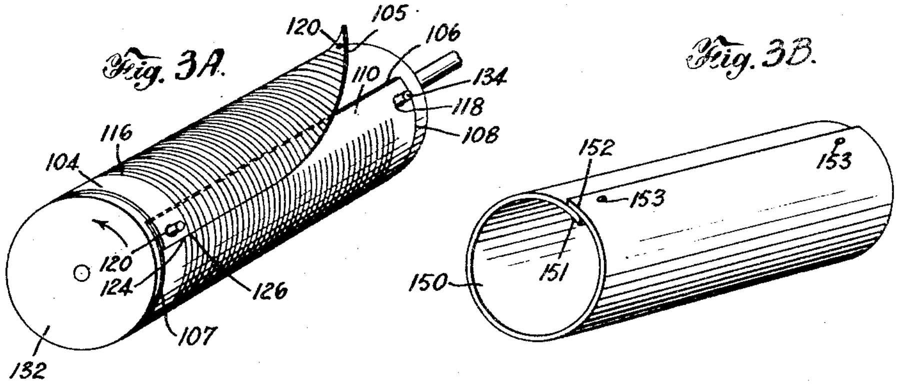

Fig. 3–A is a diagrammatic view showing the mounting of the record member of Fig. 3;

Fig. 3–B and Fig. 3–C show different forms of novel record members of the invention.

Figures 3C, 6:
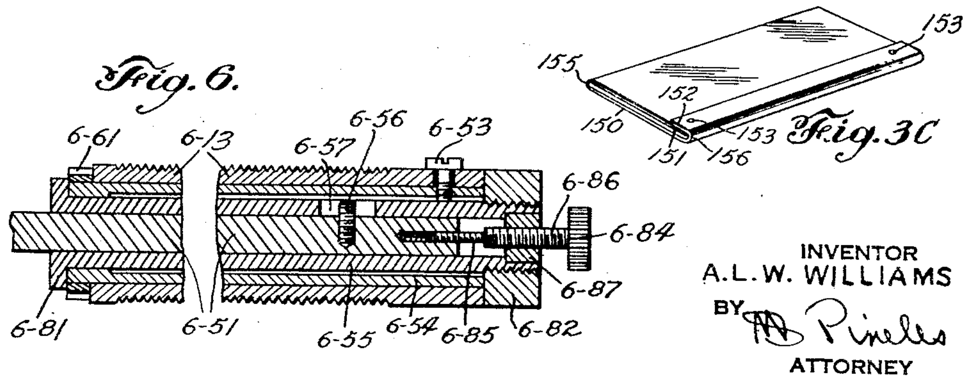
Figure 4:
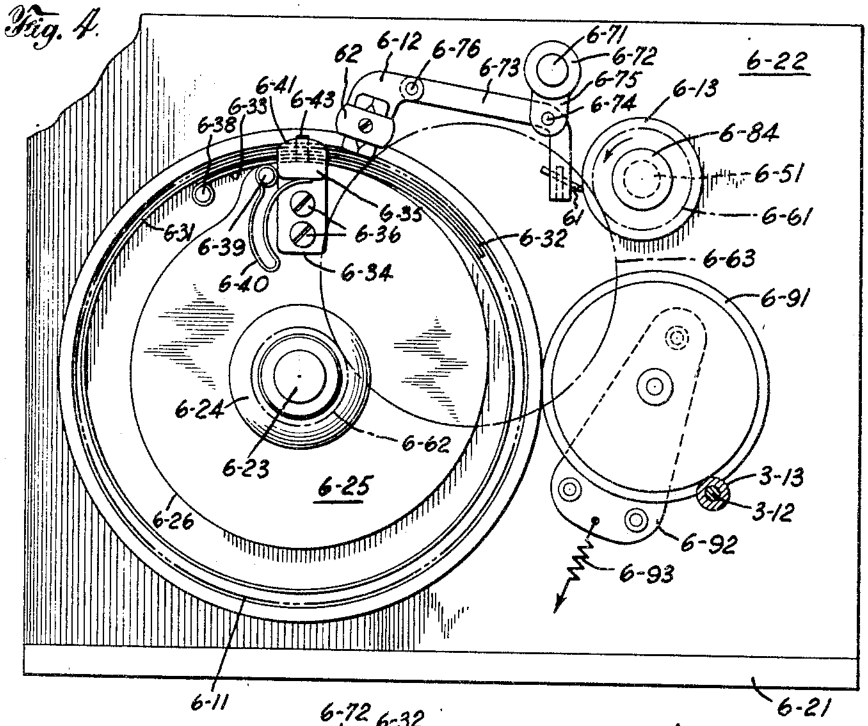
Figure 5:
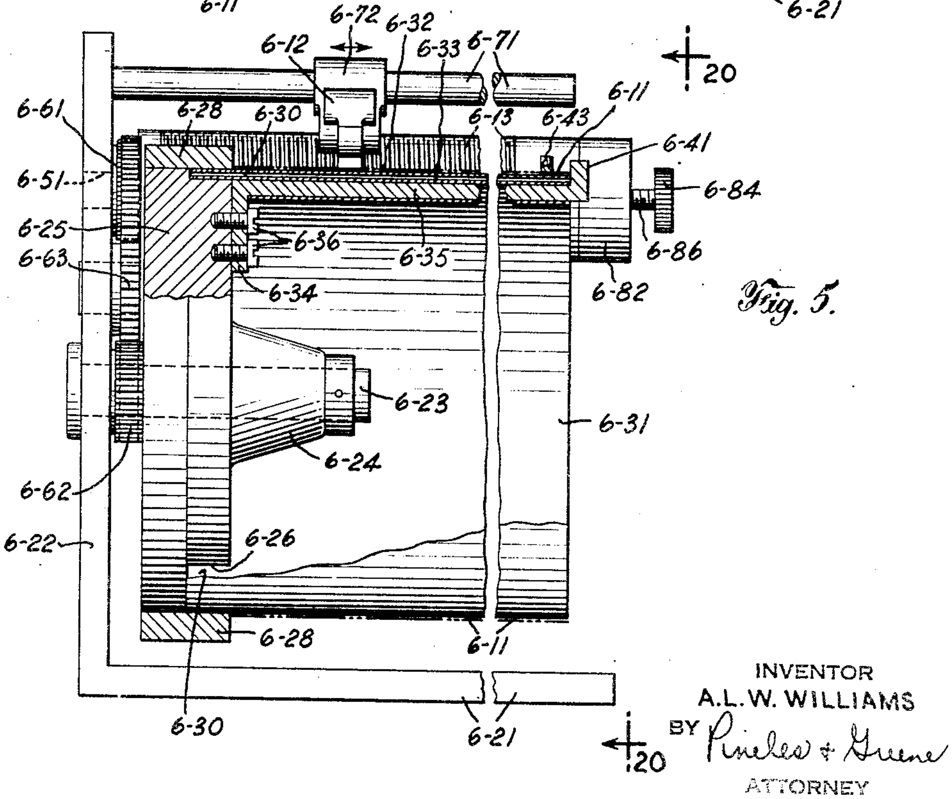

Fig. 4 is an end elevational and partly diagrammatic view of a modified form of recording device exemplifying the principal features of the invention;

Fig. 5 is a partially sectional view of the elements of the recording device of Fig. 4, and Fig. 6 is a detailed sectional view of the adjusting elements of the device.

Figure 1:
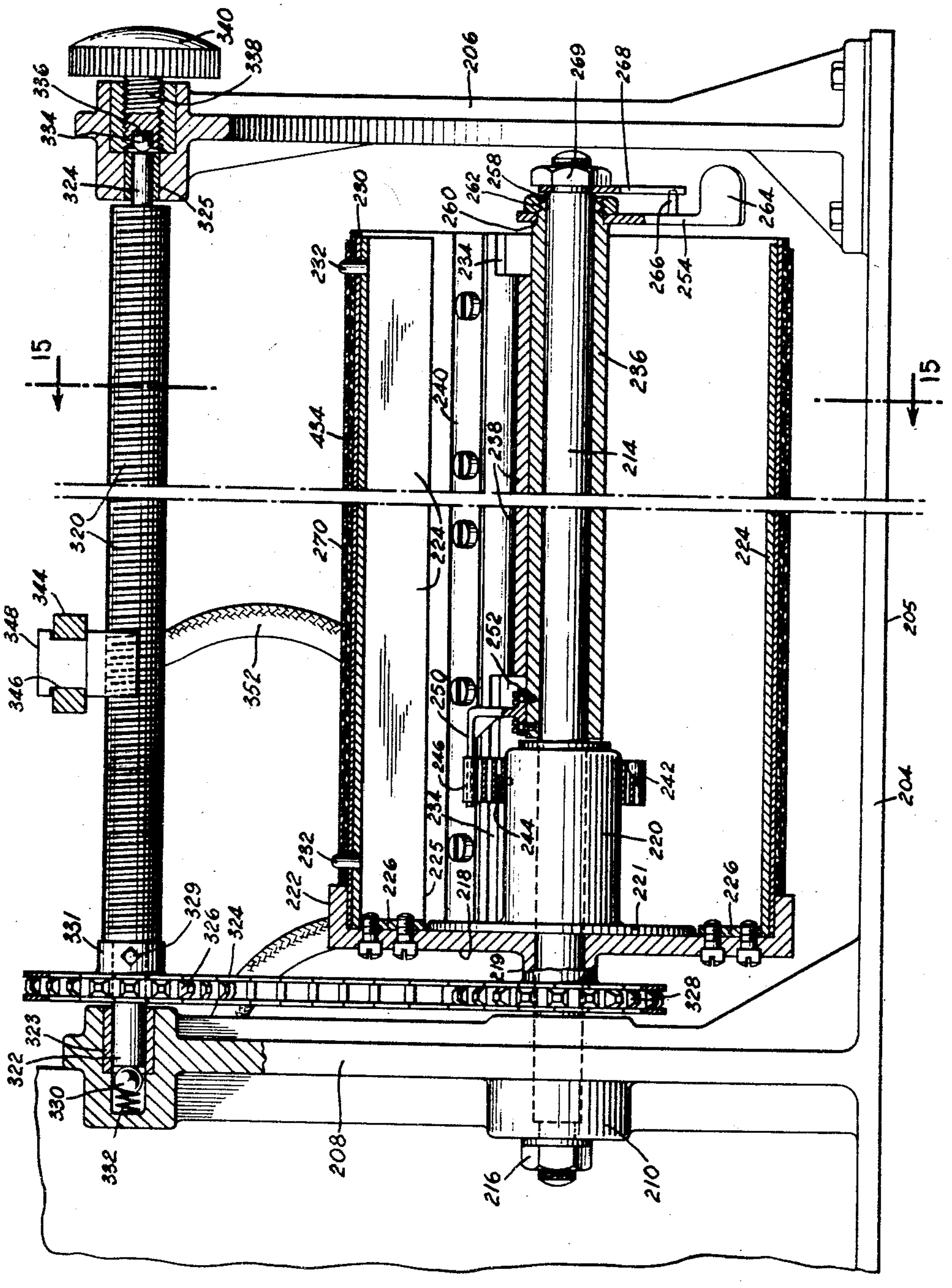
Fig. 1 is a transverse section of a magnetic transducing system in accordance with the invention.
Figure 2:
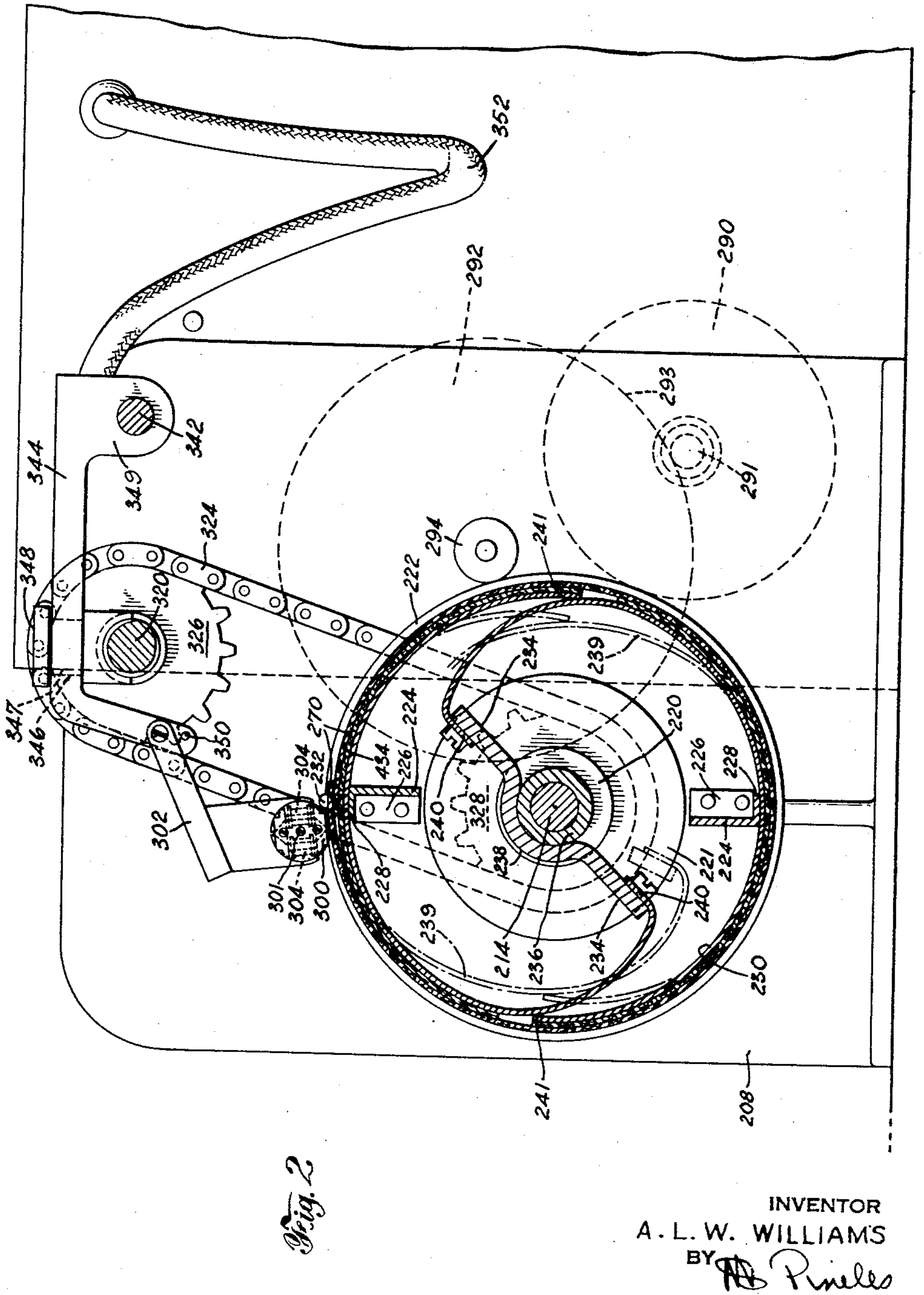
Fig. 2 is a plan view partly in section of the magnetic recorder illustrated in Fig. 1.

Figs. 1 and 2 illustrate a preferred form of the invention and disclose a practical construction for an apparatus suitable for transducing magnetic records on endless-loop generally sleeve-shaped record members as illustrated for example in Figs. 3 through 3–C. In the form shown, a framework 204 includes a base portion 205 as well as uprights 206 and 208. The upright 208 is shown as provided with an enlarged boss 210 for receiving and supporting one end of a stationary shaft 214, held in cantilever fashion so that the other end of the shaft 214 is free and unobstructed. As shown, the anchored end of the shaft 214 is held in place as by the nut 216 threadedly secured to a reduced extension of the shaft.

Rotatably mounted on the shaft 214 is shown a vertically disposed mounting plate 218 to which is secured as by welding a bearing boss 220 having a radial flange 221. The periphery of the mounting plate 218 is shown as bent over in the form of a generally cylindrical retaining lip 222. A pair of supporting arms 224, which may be of sheet metal construction have one end secured to the mounting plate 218 as by providing their ends with attaching ears 226 and welding or bolting the ears 226 in position adjacent the cylinder lip 222. The arms 224 are shown as provided with radially outwardly facing flanges 228 upon each of which are secured a thin sheet of highly flexible resilient sheet material 230 such as spring brass to establish a generally cylindrical resilient surface. Each spring sheet is inherently biased so as to tend to collapse into a small cylinder, and each extends more than halfway around inside the lip 222 of the mounting plate 218, as shown more clearly in Fig. 2. In the form shown, the resilient sheets 230 are anchored along a generally intermediate portion of the arms 224. One of the supporting arms 224 is shown as provided with a set of aligning pins 232 extending through the resilient sheet 230 and adapted to receive, anchor and align a rectangular record sheet member having correspondingly positioned apertures, as shown in Fig. 3, for example. No aligning pins are needed for the sleeve-shaped record members of Figs. 3–B and 3–C since the resilient expanding bias of the mandrel may be relied on for holding these record members in place during the transducing.

Around the free end of the shaft 214 there is shown rotatably mounted a control sleeve 236 provided with a pair of control arms 234 which may be formed from a generally rectangular sheet 238 suitably shaped along its intermediate portion to be held on the control sleeve 236 as by welding. The arms 234 which are the marginal portions of the sheet 238 extend radially outwardly far enough to engage an inwardly directed flange 240 on each of the resilient sheets 230.

The inherent resiliency of the sheets tends to rotate the control arms 234 in a counter-clockwise direction, as seen in Fig. 2, and this resiliency may be opposed and reversed as by means of the coil spring 242 shown in Fig. 1 as having its inner end held to the bearing boss 220 by the screw 244 and its outer end 246 curled around and engaging an offset extension 250 affixed to the control sleeve 236 at 252.

As indicated the resilient sheets 230, together with their adjoining structures, form a generally cylindrical mandrel member which tends to keep itself expanded by the supporting action of the flange portions 240 which under the influence of the clockwise bias rest against and urge outwardly the adjacent free ends 241 of the opposing sheet 230. The outer end of the sleeve 236 may be provided with a manual control lever 254 which fits around the reduced end 258 of a sleeve and is held against a shoulder 260 by the nut 262. The manual lever 254 is shown as having actuating surface 264 bent over so as to be easily engaged by a finger to rotate the sleeve 236 and control arms 234 in a counter-clockwise direction as seen in Fig. 2.

Such counter-clockwise rotation pulls along the flanges 240 of the sheets 230, thereby forcing the portion of the sheet between the flanges 240 and the supporting arms 224 to decrease its curvature in the manner indicated in the dash lines 239 in Fig. 2. This decreased curvature taking place at opposing portions of the mandrel serves to diminish its periphery by an appreciable amount.

A loop or sleeve shaped record member which may be formed by adhesively uniting two generally parallel ends of a rectangular sheet, as indicated in Fig. 3–B may be provided with a sleeve diameter of a size which is securely held on the resilient mandrel surface 230 when almost completely expanded and as indicated in the full lines in Fig. 2. The collapse of the surface as indicated by the dotted lines 239 provides sufficient clearance so that the sleeve shaped record member 270 may easily be slipped on or off.

To hold the collapsible surface 230 in collapsed condition, suitable latching means may be provided. As shown, the control lever 254 may have an extension 266 cooperating with a fixed plate 268 held on a reduced portion of the shaft 214 as by the nut 269. The latch plate 268 may have an edge or opening which receives and holds the pin shaped extension 266 when in its extreme counter-clockwise position. The lever 254 may have some flexibility which tends to bias the extension pin 266 toward the plate 268. The mandrel may accordingly be very simply latched into its collapsed condition by merely operating the control surface 264 downwardly to rotate the lever 254 together with the arms 234 until the pin 266 reaches and is held by the engaging edge or opening in plate 268, The mandrel may be unlatched and returned to its expanded condition by actuating the control surface 264 to flex the lever 254 and withdraw latch pin 266 from engagement with the latch plate 268, whereupon the lever is permitted to rotate in clockwise direction under the influence of the clockwise bias provided by spring 242. The outward expansion limit of the mandrel may be established as by suitably shaping a portion of the sleeve 236 such as the extension 250 so as to abut and be held by a fixed stop projection on the bearing boss 220. The lip 222 may also be utilized to limit the free expansion of the mandrel in the absence of the restraining record sleeve.

The record member 270 is provided with aligning means shown as openings for engagement with pins 232. In the form of mandrel shown, only two aligning pins 232 are provided, one at each end of the mandrel so that the intermediate portions of the record sleeve are free of obstructions and may be continuously transduced without pause or other difficulty that would be necessitated by an intervening aligning means inasmuch as practical aligning means cannot be kept below the level of the outer surface of the record member.

The record member may be of limp material, such as paper or plastic, including a stratum of permanently magnetizable composition, as for example, the finely divided magnetic materials recited above. An effective sheet construction for use with the instant apparatus is a sheet of paper about two or three mils thick having a magnetic stratum applied to its surface as an exceedingly thin layer.

In the apparatus shown, the mandrel is rotated and a magnetic transducing core 300 is held against its surface and arranged to be moved longitudinally along the mandrel as the mandrel rotates. As shown, a motor 290 may provide the impelling forces and drive through a drive roller 291 an idler roller 292 which has one friction surface 293 engaged by the motor roller 291 and another friction surface 294 driving the mandrel as by engaging the periphery of the lip 222. The idler roller 292 may have its driving surfaces so shaped as to provide the necessary speed reduction to obtain the required rate of rotation of the mandrel. Additionally, the drive transmitting surfaces may be made resilient and vibration damping as by being provided with rubber sheaths or tires to give satisfactory long and troublefree operation. The motor 290 may be of the low-power type, such as the A. C. induction type, used in phonograph turntables.

Above the mandrel there is shown mounted a feed screw 320 held between uprights 206 and 208 and driven as by the gears 326 and 328 and chain drive 324 from the mandrel. The gear 328 may be rigidly held on the mounting plate 218 as by being threadedly held on the cylindrical mounting plate extension 219. The gear 326 is shown as affixed to the feed screw 320 as by means of the set screw 329 holding a collar 331 of the gear against a reduced end portion of the screw. The feed screw 320 is mounted for longitudinal adjustment as by slidably rotatably holding each reduced end 322 and 324 in bearings 323 and 325 held in corresponding uprights 208 and 206. Adjacent the inner end of bearing 323 there is shown a resilient outward bias in the form of a ball 330 urged outwardly by the spring 332 against the bearing end 322 of the feed screw. The other bearing end 324 is shown as held in place against an outward limit in the form of a ball 334 received in a pocket 336 of an adjusting screw 338 provided with a knob 340 and threadedly engaging the upright 206.

Behind and parallel to the feed screw 320, a guide rail 342 also extends between the uprights 206 and 208. A feed arm 344 is shown as having at one end a boss 349 which fits around and engages the guide rail 342 so as to be slidable along the rail as well as rotatable around it. The feed arm 344 extends forwardly over the feed screw 320 and pivotally holds a transducing head 302 to which the transducing core 300 is secured as by means of the screw 301. At a point opposite the feed screw 320 the feed arm 344 is provided with retaining means shown in the form of an aperture 346 for holding a half-nut feed member 348. The lower portion of the feed nut member 348 contains the halfnut which threadedly meshes with the feed screw 320 so that rotation of the feed screw moves the halfnut together with its associated structures longitudinally along the feed screw and mandrel between the uprights 208 and 206. As shown in Fig. 1 the aperture 346 may provide an extra transverse margin of clearance 347 for the nut member to permit it upon engagement to automatically adjust itself within the aperture to the proper threadedly meshed position against the feed screw.

As illustrated, the gears 326 and 328 may be of the same size in which case the threads on the feed screw 320 correspond to the distribution of record track channels along the record member 270. If desired, however, the gears may be of different sizes to rotate the feed screw and mandrel at different speeds, a thread distribution being selected for the feed screw to provide the desired feed of record track channels during mandrel rotation.

Suitable engagement means, such as the pin 350, may be provided so that the transducing head may be pivoted back into retracted position either by tilting the head itself around its pivotal support or by tilting back the feed arm around its guide rail so that the pin 350 lifts the head out of the way. Either operation disencumbers the mandrel and renders it accessible for removing or replacing a record member. The construction also permits the magnetic core when in the transducing position, to rest against the record track with a force which at all times is quite small, of the order of 6 to 10 grams.

This small force is all that is required to provide excellent transducing of records between the transducing core 300 and the record track 270. Suitable stop or catch means may also be provided to hold the combined feed arm and transducing head in retracted position, as for example, when it is desired to remove or mount a record member on the mandrel.

The upright 208 may be in the form of a wall member separating the mandrel and its associated elements on one side from the drive member, such as the motor 290, as well as the amplifying assembly used with the magnetic transducing core. A cable 352 is shown as providing the connection between the amplifying assembly (not shown) and the windings of the transducing core. These windings illustrated at 304 may be provided with leads (not shown) connecting them with the cable 352.

The transducing head may be arranged so that the slight pressure of the pole pieces against the record member 270 on the resilient support 230 causes the record member to flex slightly and to contact an appreciable length of the pole faces. Such flexing establishes effective magnetic linkage between the magnetic stratum and the magnetic circuit in spite of minor variations in the positioning of the gap of the magnetic head. For example, the slight tilting of the magnetic core around its mounting screw could easily move the diminutive gap to such a position that one pole piece would remain out of contact with the record track were it not for the yielding and flexing of the record member at the pole faces. As shown, a yieldable layer 434 may be applied over the surface 230 of the mandrel or other record track support so as to add to the yieldability of the record member 270 which by itself furnishes a small amount. The resilient layer 434 may be formed of a yieldable composition, such as a very thin layer of felt or flock, as used for example, on phonograph turntables and may be in the form of a coating or self-supporting layer such as a separate thin rubber sleeve. With a mandrel construction as shown in Fig. 2, the record member supporting surface 230 does not have a uniform yieldability being practically fixed at the points of contact where it is held against the surfaces 228 of the mandrel supporting arms 224. The application of a thin layer of resilient yieldable material, as indicated above, establishes an approximately uniform yieldability of the periphery of the mandrel and assures proper transducing action. If desired, however, the yieldable layer may be placed intermediate the mandrel surface 230 and its supporting arms, or the yieldable layer may be omitted completely and the supporting arms 224 may include a resilient connection for suitably holding the surface 230 in place. With a yieldable coating layer placed either on the upper or lower surface of the spring members 230, provision should be made for the abrading action of the ends 241 of the spring members against the adjoining contacting flange portions 240 of the other spring member. As the mandrel is collapsed and expanded, the mutually contacting portions of the two spring members 230 should be permitted to slide with respect to each other without unnecessary friction by removing the yieldable layer from the necessary regions as shown. The apparatus shown in Figs. 1 and 2 is suitable for use with a magnetic record member having a uniform magnetic stratum extending over its entire surface. With such a record member and pole pieces having very small thickness of the order of about ten mils, the apparatus can be arranged to automatically feed the transducing head along a helical record track channel in which the turns of the helix are very closely spaced even though all the surface between the channels and in the channels is uniformly connected as part of the same magnetic stratum.

When playing back recordings it may be necessary to adjust the position of the pole faces longitudinally of the mandrel to make sure the pole faces trace a path over the record member surface which corresponds to the path over which the recording is made. Any deviation between the recording and playback traces will tend to cause a falling off of playback response and cross talking by the simultaneous playback of signals from adjacent traces. In the form shown the rotation of adjustment knob 340 controls the longitudinal position of the feed screw in its bearings 323, 325 and also, by means of the half-nut engagement with the transducing head, the position of the pole faces. The resilient urging of biasing spring 332 holds the feed screw against the stop ball 334 so that changing the location of the ball 334 by movement of its holder 338 along its threaded mounting makes the desired change in adjustment. The adjusting range need not be any more than is equivalent to the space between adjacent record traces.

Inasmuch as the record member is awkward to use outside of the zone between the aligning pins 232, the feed screw 320 may be arranged to limit the transducing core travel to this zone as by limiting the extent of its threaded portion. A fixed stop may be provided so that the transducing head, when moved to one limiting position, is automatically stopped at the proper point. A recording operation may then be initiated without further adjustment. A playback operation may be started with the knob 340 adjusted for maximum output level. Additionally suitable limit structure may be arranged to respond to the arrival of the transducing head at the end of the helical channel. For example a limit switch may be mounted on one of the feed screw bearing bosses and provided with a sensing member actuated by the transducing head when it reaches the end zone to trip the switch and stop the mandrel rotation to thereby indicate that the transducing operation is completed and the record member may be changed.

Fig. 3 shows one form of record member that can be used with the magnetic record transducing system of Fig. 2. The record member may be a sheet 104 of flexible material such as paper, or thin metal or plastic provided with a magnetic recording stratum. Aligning means shown as apertures 118 and 120 are located so as to engage the aligning pins of the expanding mandrel. The record member may be mounted as shown schematically in Fig. 3–A. One edge 106 is placed on the mandrel with the aligning apertures 118 along this edge engaging the aligning pins 134 as shown. The sheet is then wrapped around the mandrel, and the mandrel is collapsed so that the opposite edge 105 overlaps the first edge and the opposite aligning apertures 120 are brought down over the pins. The mandrel is now permitted to expand to firmly hold the looped record member along substantially its entire internal surface.

Transducings may now be effected by placing the transducing head against the record member as for example at one marginal portion 124 and starting the mandrel rotation in the direction indicated by the arrow with the transducing amplifier switched to the desired operative condition. The transducing head scans the record member along a helical record channel indicated by the dash lines 126 of Fig. 3–A.

The overlapped marginal region 110 adjacent edge 106 is not used for receiving recordings and may also be devoid of the magnetic recording stratum if desired. The transducing head moving across the exposed edge 105 of the record member with every turn of the mandrel is momentarily out of direct contact with the record stratum but this does not appreciably interfere with the signal response. In fact with the extremely thin record members of paper sheet about two or three mils thick, the momentary skips are practically imperceptible. The resilient yielding of the record member under the light pressure of the pole pieces diminishes the skip period. The record may be rectangularly shaped with edges 105, 106 longer than the other edges 107, 108 so as to prevent any possibility of incorrect mounting on the mandrel. The marginal portion adjacent edges 107, 108 may be free of the record stratum if desired. Any uncoated margins may be used for the application of notations or other indicia as to the nature of the recording.

The apparatus of Figs. 2 and 3 is excellent for receiving and playing back dictation or other records such as messages or conferences. The record occupies very little space and a record area about 10 inches by 8 inches in size can hold about fifteen minutes or more of recording on one surface.

Instead of providing the record member in the form of a rectangular sheet as shown in Fig. 3, it may be preformed into an endless loop as by adherently uniting two opposite edges of a generally rectangular sheet. Fig. 3–B illustrates such a preformed record member in the shape of a cylindrical sleeve 150 formed of a rectangular sheet similar to sheet 104 of Fig. 3–B in which opposite edge portions 151 and 152 are adherently united as by a suitable adhesive, so that the individual record tracks are aligned into a helical sequence. Aligning means 153 although not necessary with this type of record may be provided in the overlapped edge portions which are stronger because of their added cemented thickness. If desired, however, the aligning means may be provided in any other portion of the record member and are useful in order to have the expanding mandrel interchangeably receive either the sheet or sleeve form of record member.

The record member of Fig. 3–B may be folded flat as shown in Fig. 3–C for greater convenience in storing and handling as well as distribution. The creases formed at the folds 155 and 156 appear to have no effect on any recordings.

In Figs. 4 and 5 is shown a modified form of magnetic recording device based on the principles of the invention underlying the device of Figs. 1 and 2. The record sleeve member 6–11 is here shown as arranged to be held in its expanded generally cylindrical shape on a suitable revolvably mounted mandrel structure for cooperation with the pole face tip region of a magnetic head 62 carried on the end of an arm 6–12 and impelled in a direction parallel to the axis of rotation of the belt 6–11 and the mandrel, so as to record or play back magnetic signals recorded along narrow record traces forming a physically intangible spiral helix along the exterior magnetic surface layer of the belt 6–11.

A grooved generally cylindrical guide member 6–13 synchronized so as to rotate with the same number of revolutions as the record belt 6–11 and its supporting mandrel is arranged to be engaged by a stylus 61 which is connected to the arm 6–12 carrying the magnetic head so that the synchronized rotation of the guide member 6–13 imparts to the stylus 61 and therethrough to the magnetic head 62 a transverse motion across the width of the exposed magnetic record layer of the record sheet member 6–11, the spiral guide grooves or tracks of the guide member 6–13 defining the location of the intangible spiral magnetic record traces along which the magnetic head 62 records signals on the magnetic record belt 6–11 and plays back the magnetically recorded signals.

In Figs. 4 and 5 is shown by way of an exemplification of the invention one form of a mandrel structure and guide structure for a recording device of this type. It comprises a supporting frame structure having a base wall 6–21 provided with an upright mounting wall 6–22. The upright mounting wall 6–22 has fixedly mounted thereon a projecting shaft member 6–23 serving as a journalling support and holding in position a rotary hub 6–24 of a rotary wall member 6–25 provided on its outwardly facing side with a cylindrical guide wall 6–26 bordered by a cylindrical shoulder wall on which is seated a guide ring 6–28 affixed thereto, as by screws.

The mandrel support for the record belt 6–11 is formed essentially of a generally rectangular sheet member 6–31, such as phosphor bronze or another non-magnetic metal, bent into circular shape so that an outer end region 6–32 thereof overlaps an inner end region 6–33 thereof, the cylindrically-bent sheet member 6–31 being elastically compressed so that when it is inserted within the interior of the guide ring 6–28, the elastic restoring forces tend to expand it until the region thereof which is confined within the ring engages the inwardly facing surface thereof.

One generally circular edge region of the generally cylindrically shaped supporting sheet member 6–31 is confined within the portion of the guide ring 6–28 overlying the cylindrical guide wall 6–26 and forming therewith a circular guide recess 6–30. An arcuate section of the cylindrically-shaped outer end region 6–32 of the supporting sheet member 6–31 is united, as by spot welding, to the inner surface of the guide ring 6–28, this united end region extending from the edge of the end region 6–32 to the portion indicated at 6–34.

A relatively rigid bridge-like guide arm 6–35 underlying an arcuate section of the outer end region 6–32 of the supporting sheet structure which is united to the guide ring 6–28, is held affixed, as by screws 6–36, holding clamped a mounting shoulder of the arm to the rotatably mounted mandrel wall 6–25. The circularly bent sheet structure 6–31 is of sufficient stiffness and is designed to exert sufficient outwardly expanding elastic restoring forces of its elements so that when its edge region is retained within the recess 6–30 bounded by the guide ring 6–28, the elastically deformed circularly bent sheet structure 6–31 will be expanded until it assumes a generally cylindrical shape defined by the inner surface of the guide ring 6–28 to a portion of which an edge region thereof is united, the guide arm 6–35 serving as an inner guide for the inner end region 6–33 of the sheet structure 6–31 as it expands in outward direction.

The inner end of the sheet structure 6–31 is shown provided with a grip portion 6–38 which may be formed thereon either by bending it in the manner indicated in Fig. 4 or by affixing thereto, as by welding, a strip of metal which serves as a grip by means of which it may be gripped and pulled against the action of its elastic forces to reduce the outer diameter of the generally cylindrical structure formed by the sheet member 6–11 to a sufficiently small size as to permit placing of the belt-like record sheet member 6–11 on the contracted sheet structure 6–31 so that upon releasing the same, the expanding sheet structure will form a proper cylindrical support maintaining the thin record belt 6–11 in a generally cylindrical expanded operative condition.

As indicated in the bottom portion of Fig. 4, the guide wall region 6–26 is of eccentric shape so as to provide space for the contraction of the resilient mandrel sheet member 6–31 when its inner edge 6–33 is pulled inwardly over the guide arm 6–35 to reduce its outer diameter.

Means may be provided for arresting and retaining the inner end region 6–33 of the supporting sheet member 6–31 in its contracted position, the arresting means being formed, for instance, by a spring-biased latch element 6–39 releasably held so that when it is released it becomes wedged between one edge of the guide member 6–35 and the portion of the sheet member 6–33 adjoining the same.

As indicated in Figs. 4 and 5, the outwardly projecting end of the inner guide arm 6–35 is provided with an outward flange projection 6–41 which may serve as a shoulder for locating the outer edge of the belt-like record member 6–11 when it is placed on the mandrel structure formed on the sheet structure 6–31. The inner edge portion of the end region 6–32 of the mandrel sheet member 6–31 overlying the region of the inner edge of the guide arm 6–35 may be provided with a series of outwardly bent tooth-like projections struck out from the body of the sheet member for confining and defining the inner edge of the belt-like record sheet member 6–11 when it is placed on the mandrel.

In other words, the flange projection 6–41 of the guide arm 6–35, in conjunction with the struck-out tooth-like projections of the sheet member 6–31 confine the belt-like record member 6–11 to a definite location when it is placed on the mandrel. In addition, the end region 6–32 of the sheet member 6–31 overlying the guide arm 6–35 has affixed thereto, as by spot welding, an aligning projection 6–43 arranged to fit into a corresponding aligning region of the belt-like record sheet member 6–11 so that it may be placed on the mandrel only in one definitely aligned position.

The cylindrical grooved stylus guide structure 6–13 indicated in Fig. 4 may be combined with the hub structure 6–12 of the mandrel so as to rotate therewith. With such arrangement, the magnetic head may be joined to the stylus by a suitable U-shaped connecting member so that the transverse motion imparted to the stylus by the guide structure 6–13 imparts a corresponding transverse motion to the guide structure and therethrough to the magnetic head, the guide structure being carried by a carriage or an arm so as to confine the movement of the magnetic head and the stylus to a definite longitudinal direction parallel to the direction of the axis of the shaft 6–23 around which the mandrel with the record sheet member 6–11 rotates.

In other words, if the grooved stylus guide cylinder, such as cylinder 6–13, is arranged to be carried and rotated with the hub 6–24 of the mandrel wall 6–25, the grooved guide cylinder 6–13 will impart to the stylus and to the magnetic head connected thereto a transverse motion along a direction parallel to the axis of rotation of the mandrel, thereby causing the pole face region of the magnetic head to record or play back magnetic signals along spiral or helical record trace convolutions.

Instead of combining the grooved stylus guide cylinder 6–13 with the hub 6–24 of the mandrel structure, the stylus guide cylinder of Figs. 4 and 5 is mounted for rotation around an axis parallel to the axis of rotation of the mandrel with the same number of revolutions per minute as the mandrel but on the exterior of the mandrel. In the arrangement shown, the grooved stylus guide cylinder 6–13 is arranged to rotate around a shaft post 6–51 affixed to the upright wall 6–22 and projecting in a general direction parallel to the axis of the mandrel shaft 6–23.

As indicated in Fig. 6, the grooved stylus guide cylinder 6–13 is seated on and affixed as by one or more screws 6–53 to the exterior of a supporting sleeve 6–54, which is arranged to rotate on a sleeve 6–55 seated on the shaft 6–51. The inner sleeve 6–55 is connected with the shaft 6–51 by a key element shown in the form of a screw stop 6–56 held affixed in the shaft 6–51, and slidingly engaging a key slot 6–57 so as to permit limited longitudinal movement of the inner sleeve 6–55 relative to the supporting shaft 6–51. The inner sleeve 6–55 forms a journalling support for the outer sleeve 6–54 and the grooved stylus guide cylinder 6–13 affixed thereto, and one of the two sleeves may be provided with a facing of bearing material, such as oilite, along spaced sections thereof in which case the journalling support is provided only by the sections provided with such self-lubricating bearing material.

There is also provided a motion transmitting connection between the rotary mandrel wall 6–25 and the grooved stylus guide cylinder 6–13 so as to assure that the mandrel and the stylus guide cylinder 6–13 are at all times synchronized and rotate with the same number of revolutions per minute. In the arrangement shown in Figs. 4 and 5, the motion transmitting connection is provided by two gears 6–61, 6–62 of the same diameter, and forming fixed parts connected to the back ends of the stylus guide cylinder 6–13 and the mandrel wall 6–25, and arranged to mesh with the teeth of an intermediate gear 6–63 arranged to rotate on a journalling support mounted in the upright wall 6–22 of the mechanism so that, whenever the mandrel structure with its mandrel wall 6–25 rotates, the stylus guide cylinder 6–13 will rotate in the same direction and with the same number of revolutions as the mandrel with the record sheet member 6–11 held aligned thereon.

For the sake of simplicity, the three gears 6–61, 6–62, and 6–63 are indicated in Fig. 5 by dash-dot circles. The gear 6–61 is shown affixed to the back end of the supporting sleeve 6–54 of the grooved stylus guide cylinder 6–13, and the gear 6–62 is shown affixed to the back side of the mandrel wall 6–25 so that they rotate therewith respectively.

As indicated in Figs. 4 and 5, suitable means are also provided to assure that the connecting structure connecting the stylus 61 with the magnetic head 62 are properly connected and guided for causing the stylus as well as the magnetic head to move in longitudinal directions parallel to the axis of rotation of the mandrel.

In Figs. 5 and 6 is indicated diagrammatically one form of such guiding arrangement for the stylus and the magnetic head. A guide post 6–71 of circular cross section is supported in a fixed position by the upright wall 6–22 of the mechanism so that it extends in a direction parallel to the axis of the mandrel. A sleeve-like carriage structure 6–72 is arranged to slide freely on the guide post 6–71, and may be provided with bearing elements to assure that the carriage moves freely and substantially without any frictional resistance along the guide post 6–71. A lever member 6–73 is pivotally mounted on a pivot 6–74 held within two ear projections 6–75 of the carriage sleeve 6–72. One arm of the lever 6–73 supports the stylus 61 in a position where the stylus point engages a guide groove of the stylus guide cylinder 6–13, and the other arm of the lever 6–73 has pivotally connected thereto, as by a pivot 6–76, an arm 6–12 which supports the magnetic head 62 in a position in which its pole faces engage a longitudinal element of the exposed magnetic record player of the belt-like record sheet member 6–11 as it is being rotated by the mandrel in counterclockwise direction, as seen in Fig. 4. The portion of the lever 6–73 carrying the magnetic head 62 exerts gravitational forces sufficient to maintain the stylus 61, carried by the other arm, in positive engagement with the guide groove of the stylus guide cylinder 6–13. Since the magnetic head 62 has a pivotal connection with the lever 6–73 it will automatically adjust itself in a position in which its pole faces maintain stable contact engagement with the exposed elements of the magnetic recording medium on which they rest, and the maximum force with which the pole faces of the magnetic head press against the exposed record surface may be readily kept within the required limits.

The revolvably mounted mandrel structure of the recording device of Figs. 4 and 5 is arranged to be driven by providing a coupling roller 6–91 revolvably mounted on a shaft post carried by a slider plate 6–92 guided for slidable movement adjacent to the face of the upright mounting wall 6–22 and urged by a biasing spring 6–93 to establish coupling engagement between the end of a motor shaft 3–12 and the exterior surface of the circular ring member 6–28 of the mandrel structure, so that when the drive motor rotates, its shaft end 3–12 drives through the coupling pulley 6–91 the mandrel at the slow speed required for carrying on magnetic recording or playback operations. The motor may be mounted on the base wall 6–22 of the recording mechanism behind the mandrel so that its shaft end 3–12 is aligned in the plane of the ring member 6–28 of the mandrel.

There are also provided compensating means operative to compensate for any misalignment between the guide grooves of the stylus guide member and the physically intangible spiral record traces along which magnetic records are made on the record sheet member of a recording mechanism of the type described above. Such misalignment may occur, for instance, if as the result of frequent use an aligning opening of a record sheet member is slightly enlarged, or if a record made on one mechanism provided with one stylus guide member is played back by another recording mechanism having a slightly displaced aligning pin. There are a variety of ways in which a recording mechanism of the invention may be provided with such alignment compensating means. Thus, for instance, the compensating means may be formed by elements which make it possible to slightly displace the aligned position of the stylus relatively to the pole faces of the magnetic head, such compensating mechanism being combined with the elements which form the mechanical interconnection between the stylus and the magnetic head. Such compensating means may also be formed by elements which make it possible to displace the aligning elements which features the position of alignment between the magnetic record member and the stylus guide member. To this end means may be provided for controllably deplacing the supporting elements which support the record member relatively to the supporting elements which support the stylus member, or, alternatively, for displacing the elements which support the stylus guide member relatively to the elements which support the record member. In Figs. 4 and 5 is shown one form of misalignment compensating means which permit adjustably controllable displacement of the position in which the stylus guide member is held so as to compensate for any misalignment between the stylus guide grooves and the intangible magnetic record traces of a magnetic record member supported by the mandrel structure.

Fig. 6 shows the structural relationship of the elements which support the stylus guide member on the guide shaft post 6–51, of the recording mechanism of Figs. 4 and 5, the position of the shaft post 6–51 being fixed in relation to the mandrel structure which supports the record member 6–11. As explained above, the inner sleeve 6–55 is seated on the shaft 6–51 and is keyed for longitudinal slidable movement thereon. This inner sleeve 6–55 forms a journalling support for the outer sleeve 6–54 to which the grooved stylus guide cylinder is affixed. The mounting sleeve 6–54 of the stylus guide cylinder 6–13 on the inner sleeve 6–55 is fixed by a back collar or flange 6–81 and a front retaining collar affixed to the front end of the inner sleeve 6–55 as by a threaded connection as shown. This makes it possible to impart a controlled longitudinal adjustment of the position of the stylus guide cylinder 6–13 relative to its fixed supporting shaft 6–51 by providing a differential screw connection between the supporting post 6–51 and the inner sleeve 6–55 slidingly keyed thereon. As indicated in Fig. 6 a simple differential screw having a screw head 6–84 is provided with a shank section 6–85 having a thread of one pitch, and a screw section 6–86 having a thread of a different pitch. The screw section 6–85 engages a thread bore of the fixed supporting shaft 6–51, and the threaded section 6–86 engages a thread bore of a nut element affixed, as by swaging, within the open front end of the slidingly keyed inner sleeve 6–55 so that by turning the screw head 6–84 the inner sleeve 6–55 will be displaced, for each revolution of the screw, by a distance equal to the distance between the pitches of the two threads.

With such arrangement, since the shaft 6–51 is fixed, a person listening to a record played back from a recording mechanism, of the type described above, has merely to turn the screw head 6–84 until the signals played back from the record have reached the maximum level, this being the position of perfect alignment between the guide grooves of the stylus guide member and the intangible magnetic traces along which the thin aligned pole faces of the magnetic record head record the signals and play back the signals recorded on the traces.

In the recording devices exemplifying the invention, as described above, the grooved stylus guide members are made in such form that they may be readily replaced after they are worn out. This feature makes it possible to manufacture such stylus guide members on an economical basis by molding them by a low cost plastic composition. However, the grooved stylus guide members may be also made of metal or other wear-resisting material, the grooves of which will withstand prolonged wear.

Record sheet members of the type used in the recording devices described herein may be readily obliterated by passing the entire record sheet member through a coil transversed by A. C. current which produces within the coil space through which the record sheet member has passed a magnetic field of one thousand oersteds, provided the recording sheet member is moved out of the coil at such a rate that on leaving the coil it passes through a space in which the magnetic field decays along three wave lengths of the field at a frequency of the alternating magnetizing current supplied to the coil.

Alternating current of a standard frequency, such as a sixty cycle frequency, may be utilized for supplying the magnetizing current to such a record erasing coil.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a magnetic transducing device: a frame, a collapsible substantially circular cylindrical mandrel rotatably connected to said frame and comprising two coextensive substantially coaxial cylindrical spring members, means permanently connected to and biasing each of said spring members to expand outwardly to form said substantially circular cylindrical mandrel; means engaging said cylindrical mandrel at one end only limiting its outward movement; a thin, flexible sleeve of magnetizable material mounted around said mandrel aiding in limiting the outward expansion of said spring members; a lead screw connected to said frame and spaced from and extending parallel to said cylindrical mandrel; transducer head means mounted on said frame for movement in two directions with respect to said lead screw, one of said motions being parallel to the axis of said lead screw and the other motion being toward and away from said lead screw; and means for rotating said mandrel and said lead screw.

2. A magnetic transducing device as set forth in claim 1, further characterized by control arm means extending axially lengthwise inside said cylindrical mandrel and connected to said cylindrical spring members substantially throughout the axial length of said spring members for actuation of said spring members, and a spring inside said mandrel one end of which is connected to said frame and the other end of which is connected to said control arm means.

3. A magnetic transducing device as set forth in claim 2, further characterized by operator controlled means secured to said control arm means for turning said control arm means against the bias of said cylindrical spring members to reduce the circumference of said cylindrical mandrel to facilitate removing said flexible sleeve of magnetizable material and connecting a new sleeve in place.

References Cited in the file of this patent

UNITED STATES PATENTS

| | | |
|---|---|---|
| 649,725 | Grelet et al. | May 15, 1900 |
| 2,010,690 | Fox | Aug. 6, 1935 |

(Other references on following page)

UNITED STATES PATENTS

| | | |
|---|---|---|
| 2,043,884 | Crudo | June 9, 1936 |
| 2,082,353 | Proctor | June 1, 1937 |
| 2,109,468 | Conant | Mar. 1, 1938 |
| 2,137,157 | Crudo | Nov. 15, 1938 |
| 2,229,293 | Huntley | Jan. 21, 1941 |
| 2,233,915 | Conrad | Mar. 4, 1941 |
| 2,333,463 | Bryce | Nov. 2, 1943 |
| 2,378,388 | Begun | June 19, 1945 |
| 2,381,463 | Potter | Aug. 7, 1945 |
| 2,447,473 | Finch | Aug. 17, 1948 |
| 2,469,423 | Wise | May 10, 1949 |
| 2,535,480 | Bergun | Dec. 26, 1950 |

FOREIGN PATENTS

| | | |
|---|---|---|
| 783,581 | France | Apr. 8, 1935 |